United States Patent [19]

Baumann et al.

[11] Patent Number: 4,715,468
[45] Date of Patent: Dec. 29, 1987

[54] DEVICE FOR CONTROLLING A ROLL BAR SERVING AS A SAFETY DEVICE FOR THE OCCUPANTS OF A MOTOR VEHICLE

[75] Inventors: Karl-Heinz Baumann, Böblingen; Gerald Schick, Grafenau; Lothar Kassing, Nufringen; Alban Bossenmaier, Stuttgart; Luigi Brambilla, Böblingen, all of Fed. Rep. of Germany

[73] Assignee: Daimler-Benz Aktiengesellschaft, Stuttgart, Fed. Rep. of Germany

[21] Appl. No.: 945,522

[22] Filed: Dec. 23, 1986

[30] Foreign Application Priority Data

Dec. 23, 1985 [DE] Fed. Rep. of Germany ....... 3545874

[51] Int. Cl.⁴ .............................................. B60R 21/00
[52] U.S. Cl. .................................... 180/271; 280/756
[58] Field of Search ................ 180/271; 280/727, 753, 280/756, 801

[56] References Cited

U.S. PATENT DOCUMENTS 3,292,726 12/1966 Jette, Jr. ................................ 280/801
3,420,572 1/1969 Bislrond ............................... 180/271

FOREIGN PATENT DOCUMENTS 3438739 3/1986 Fed. Rep. of Germany ...... 180/271
816849 3/1981 U.S.S.R. .............................. 180/271

Primary Examiner—John J. Love
Assistant Examiner—Ross Weaver
Attorney, Agent, or Firm—Barnes & Thornburg

[57] ABSTRACT

A device for actuating a safety device, in particular a roll bar in a motor vehicle. The device includes a first sensor which is actuated when a vehicle acceleration exceeding a predetermined limiting value occurs and which generates a switch signal for a release device to activate the roll bar. The device also includes second and third sensors which control switches when both at least one wheel suspension is fully extended and the vehicle is tilted about either a longitudinal or transverse axis, so as to actuate the safety device during even relatively slow overturns.

8 Claims, 1 Drawing Figure

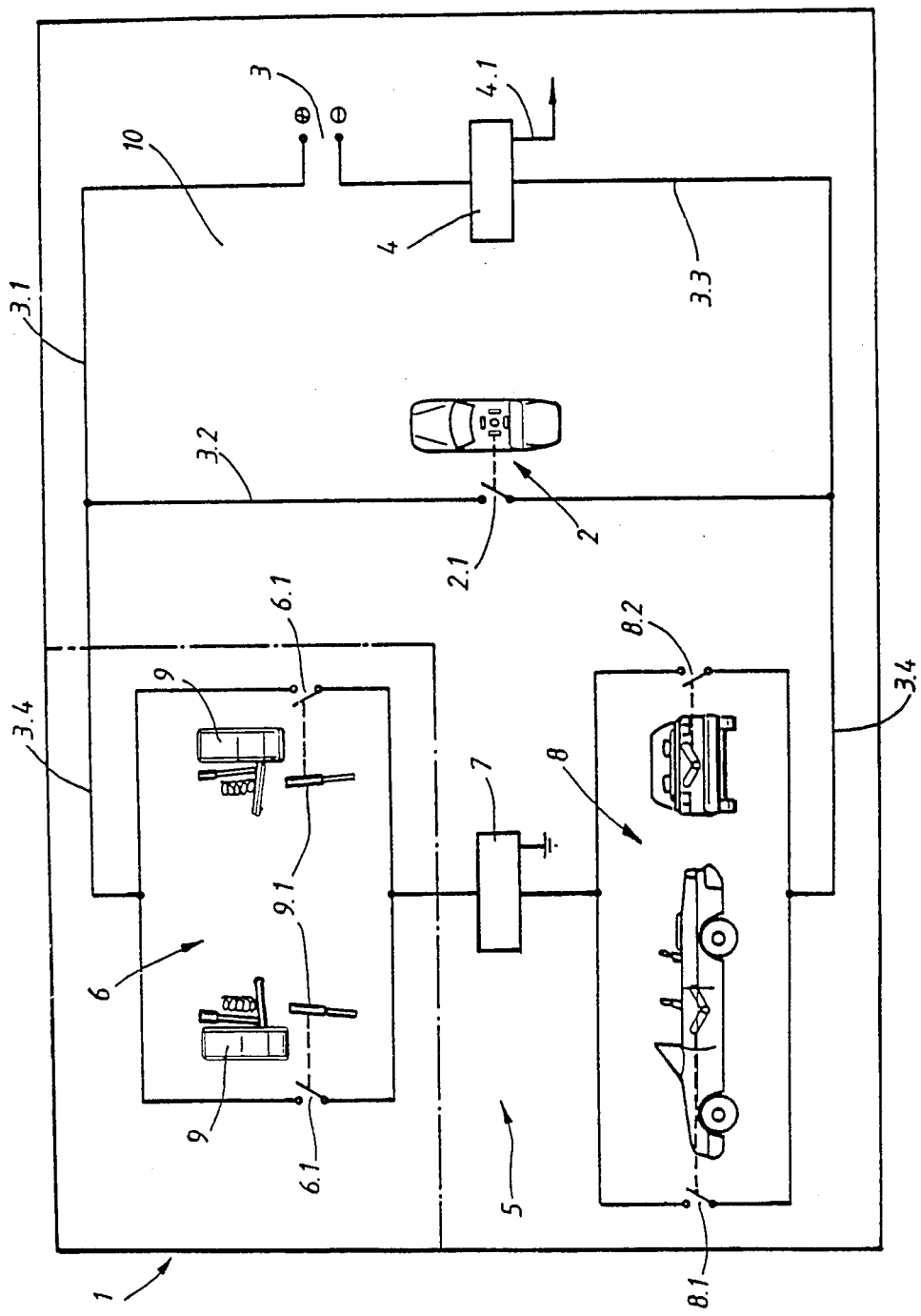

DEVICE FOR CONTROLLING A ROLL BAR SERVING AS A SAFETY DEVICE FOR THE OCCUPANTS OF A MOTOR VEHICLE

BACKGROUND AND SUMMARY OF THE INVENTION

The present invention relates to a device for actuating a safety device, in particular, a roll bar, with a first sensor which actuates the safety device when a vehicle acceleration or deceleration exceeds a threshold value.

A known device of this general type for controlling a roll bar serving as a safety device for the occupants of motor vehicles is shown in U.S. Pat. No. 3,292,726. That device has a first circuit assigned to the vehicle standstill state having a first sensor which is actuated when a specific vehicle acceleration occurs and which closes the circuit, thereby energizing a release device for activating the roll bar. The second circuit, which is assigned to the vehicle driving state, contains a second sensor closed in the driving state. Connected in series with the second sensor is a third sensor which likewise closes the circuit under specific conditions acting on the safety belt, thereby again energizing the release device. Although a considerable degree of safety is guaranteed with this device, it does not take into account all the driving states causing the vehicle to overturn.

An object of the present invention is to provide a device for actuating a safety device such that it detects all the driving states which cause a vehicle to overturn and guarantees reliable activating of the release device for the roll bar.

This and other objects are attained by the present invention by providing: a first sensor which activates the safety device when the vehicle acceleration or deceleration exceeds a threshold value; a second sensor which outputs a second signal upon sensing when at least one wheel suspension is fully extended; and a third sensor for outputting a third signal upon sensing tilting vehicle around its longitudinal and transverse axes. The safety device is actuated when both the second and third signals are outputted by the second and third sensors in addition to being activated by said first sensor.

It is therefore possible, with the device according to a preferred embodiment of the present invention, to release the roll bar by essentially two procedures which depend on different release criteria. Thus, one release procedure serves for detecting relatively slow overturns not caused by a sudden impact or collision. This can occur, for example, when driving the vehicle up a slope and tipping it over from an unstable position. The other release procedure serves for detecting vehicle overturns which are caused by a collision.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows a preferred embodiment of the present invention.

DETAILED DESCRIPTION OF THE DRAWINGS

The device 1 illustrated in the FIGURE has a first sensor 2 which is an inertia switch and is arranged in the center of the vehicle. This sensor 2 is tripped in response to vehicle accelerations exceeding 4 g (g=acceleration due to gravity) both in the x-axis (transverse) and in the y-axis (longitudinal) of the vehicle, with the result that switch 2.1 is closed. Starting from one pole of a power supply means 3, a circuit to the other pole of the power supply means is closed via the lines 3.1, 3.2 and 3.3. The line 3.3 contains a conventional release device 4 which, at its output 4.1, generates a release signal for activating the roll bar (not shown). The roll bar is thereupon raised from its position of rest into its position for performing the protective function, by means of compression spring elements, for example.

Connected to the first sensor 2 by means of the line 3.4, and parallel to the line 3.2, is a series circuit 5 which comprises a second sensor means 6, a time delay element 7 and a third sensor means 8. The second sensor means 6 has switches 6.1 arranged on the two rear wheels 9 of the vehicle in their spring suspension region 9.1. Each switch is closed when the rear-wheel suspension is completely extended for the duration of this extension. The switches 6.1 are connected in parallel with one another, so that the timing element 7 is activated even when only one switch 6.1 is closed. However, the timing element 7 makes a conductive connection between the two sensor means 6 and 8 only when at least one switch 6.1 of the sensor means 6 is closed for a predetermined time. This ensures that in the event of only a very brief spring extension of one wheel or both wheels, for example over a bad stretch of road, the timing element 7 will not make any conductive connection.

The third sensor means 8, located after the timing element 7 in the series circuit 5, has a tilt switch 8.1 which closes in response to a vehicle tilt about the y or longitudinal axis, and a tilt switch 8.2 which closes in response to a vehicle tilt about the x or transverse axis, these switches being connected in parallel with one another.

For the release procedure using the series circuit 5 and serving for detecting relatively slow overturns not caused by a sudden impact or collision, the collapsible roll bar is only released when simultaneously: the suspension of one rear wheel or of both rear wheels is completely extended, so that at least one switch 6.1 is closed; the time criterion of at least one closed switch 6.1 for the timing element 7 is satisfied; and there is a vehicle tilt about the x-axis or y-axis, so that the switch 8.1 and/or 8.2 is closed.

The tilt switches 8.1 and/or 8.2 prevent a release of the roll bar, when the vehicle drives over a hump and the rear-wheel suspension is extended, without the vehicle tilting, and when the vehicle is lifted in the workshop.

Vehicle overturns caused by an impact usually have higher rotational speeds of the vehicle relative to the x-axis and y-axis, and it is therefore expedient not to release the roll bar only when the rear wheel suspension is extended, but as soon as the impetus occurs. This requirement is satisfied by the release of the roll bar in response to the release procedure involving the first sensor 2. This independent release procedure provides for release of the roll bar during a collision, for example in the rear region of the vehicle, even when the rear-wheel suspension is prevented from being extended as a result of severe vehicle deformation, which otherwise would prevent triggering of the release of the roll bar when the vehicle subsequently overturns.

In the illustrated preferred embodiment, all the parts of the device, with the exception of the second sensor means 6, are accommodated in the housing 10 which is arranged in a region of the vehicle protected against deformation.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. A device for actuating a safety device, in particular a roll bar, the device having first sensor means which output a first signal to cause the actuation of said safety device when a vehicle acceleration or deceleration exceeds a threshold value, said device comprising:
    second sensor means for outputting a second signal upon sensing when at least one wheel suspension is fully extended;
    third sensor means for outputting a third signal upon sensing tilting of said vehicle around at least one of a longitudinal axis and a transverse axis of said vehicle,
    said safety device being actuated when both said second and third signals are outputted by said second and third sensor means.

2. The device of claim 1, wherein said second and third sensor means are connected in a series circuit with each other, this series circuit being connected in parallel with said first sensor means.

3. The device of claim 2, further comprising a time delay switch means interposed between said second and third sensor means in said series circuit, for making a conductive connection between said second and third sensor means only after said second sensor means has outputted said second signal for predetermined time.

4. The device of claim 1, wherein said second sensor means includes two sensor switches located respectively at spring suspension regions of rear wheels of said vehicle, said sensor switches being connected parallel to one another.

5. The device of claim 1, wherein all said elements of said device except for said second sensor means are located in a housing that is in a region of said vehicle which protects said housing from deformation.

6. Device for controlling a roll bar serving as a safety device for occupants of motor vehicles, with a first sensor which is actuated when a vehicle deceleration or acceleration exceeding a predetermined limiting value occurs and which generates a switch signal for a release device to activate the roll bar, and with a second sensor and a third sensor, connected in series with the second sensor, which under specific conditions likewise generate a switch signal for the release device, the improvement comprising:
    said second sensor device having a switch which is arranged on at least one rear wheel of the vehicle in its spring suspension region and is actuated when the rear wheel suspension is completely extended, and said third sensor means having a tilt switch which detects a vehicle tilt relative to the x-axis and y-axis of the vehicle and is actuated when a specific tilt is exceeded, wherein a
    timing element is connected in series between the second and third sensor means which makes a conductive connection between the two sensor means only when the switch of the second sensor is actuated for a predetermined time, and
    wherein the series connection of the second and third sensors is connected in parallel with the first sensor.

7. Device according to claim 6, wherein a switch is arranged on each rear wheel of the vehicle, the switches being connected in parallel.

8. Device according to claim 6, wherein all the parts of the device, with the exception of the switches of the second sensor means, are accommodated in a housing which is located in a region of the vehicle protected against deformation.

* * * * *